(12) United States Patent
Ryu et al.

(10) Patent No.: US 10,892,464 B2
(45) Date of Patent: Jan. 12, 2021

(54) BATTERY MODULE

(71) Applicant: LG CHEM, LTD., Seoul (KR)

(72) Inventors: Jae-Uk Ryu, Daejeon (KR); Dal-Mo Kang, Daejeon (KR); Su-Chang Kim, Daejeon (KR); Jeong-O Mun, Daejeon (KR); Ji-Su Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 41 days.

(21) Appl. No.: 16/339,631

(22) PCT Filed: Apr. 3, 2018

(86) PCT No.: PCT/KR2018/003933
§ 371 (c)(1),
(2) Date: Apr. 4, 2019

(87) PCT Pub. No.: WO2018/194296
PCT Pub. Date: Oct. 25, 2018

(65) Prior Publication Data
US 2020/0044227 A1    Feb. 6, 2020

(30) Foreign Application Priority Data

Apr. 18, 2017  (KR) .................. 10-2017-0049938
Mar. 6, 2018   (KR) .................. 10-2018-0026447

(51) Int. Cl.
*H01M 2/26*     (2006.01)
*H01M 10/6555*  (2014.01)
(Continued)

(52) U.S. Cl.
CPC ............. *H01M 2/266* (2013.01); *H01M 2/06* (2013.01); *H01M 2/1083* (2013.01); *H01M 10/6555* (2015.04)

(58) Field of Classification Search
CPC .... H01M 2/266; H01M 10/6555; H01M 2/06; H01M 2/1083; H01M 2220/20;
(Continued)

(56) References Cited

U.S. PATENT DOCUMENTS

2011/0287299 A1    11/2011  Kim
2014/0065467 A1*   3/2014   Choi .................. H01M 2/348
                                                      429/158
(Continued)

FOREIGN PATENT DOCUMENTS

CN    101527352 A    9/2009
CN    102044693 A    5/2011
(Continued)

OTHER PUBLICATIONS

International Search Report (PCT/ISA/210) issued in PCT/KR2018/003933, dated Jul. 24, 2018.

*Primary Examiner* — Michael L Dignan
(74) *Attorney, Agent, or Firm* — Birch, Stewart, Kolasch & Birch, LLP

(57) ABSTRACT

A battery module having a low height and ensuring stable cooling performance, including a heat dissipation member disposed at a lower portion thereof, a cell assembly having a plurality of can-type secondary batteries stacked in a lying-down form in a horizontal direction and a bus bar, the bus bar including a connection part contacting electrodes of two or more can-type secondary batteries of the cell assembly to electrically connect the two or more can-type secondary batteries, and a heat transfer part located below the connection part to contact the heat dissipation member to transfer heat of the secondary batteries to the heat dissipation member.

13 Claims, 11 Drawing Sheets

(51) Int. Cl.
*H01M 2/06* (2006.01)
*H01M 2/10* (2006.01)

(58) Field of Classification Search
CPC ......... H01M 10/6554; H01M 10/6556; H01M 2/1077; H01M 2/206; H01M 10/6553; H01M 10/653; H01M 10/613; H01M 10/625; H01M 10/643
See application file for complete search history.

(56) References Cited

U.S. PATENT DOCUMENTS

| | | | |
|---|---|---|---|
| 2015/0072211 A1* | 3/2015 | Nakamura | H01M 2/1077 429/121 |
| 2015/0086823 A1* | 3/2015 | Liew | H01M 2/1083 429/99 |
| 2016/0336563 A1 | 11/2016 | Choi et al. | |

FOREIGN PATENT DOCUMENTS

| | | |
|---|---|---|
| CN | 102263301 A | 11/2011 |
| CN | 103050656 A | 4/2013 |
| CN | 202192895 U | 9/2013 |
| CN | 103346355 A | 10/2013 |
| CN | 103490032 A | 1/2014 |
| CN | 105469997 A | 4/2016 |
| CN | 106505277 A | 3/2017 |
| CN | 106532192 A | 3/2017 |
| DE | 10 2015 008 985 A1 | 2/2016 |
| JP | 2000-77049 A | 3/2000 |
| JP | 2004-130910 A | 4/2004 |
| JP | 4007763 B2 | 11/2007 |
| JP | 2011-159474 A | 8/2011 |
| JP | 2013-229266 A | 11/2013 |
| JP | 2017-59346 A | 3/2017 |
| KR | 10-2017-0011349 A | 2/2017 |
| KR | 10-2017-0022371 A | 3/2017 |
| KR | 10-2017-0030954 A | 3/2017 |
| WO | WO 2013/009759 A2 | 1/2013 |
| WO | WO 2016/045752 A1 | 3/2016 |
| WO | WO 2017/190907 A1 | 11/2017 |

\* cited by examiner

BATTERY MODULE

CROSS-REFERENCE TO RELATED APPLICATIONS

The present application claims the benefit of Korean Patent Application No. 10-2017-0049938 filed on Apr. 18, 2017 and Korean Patent Application No. 10-2018-0026447 filed on Mar. 6, 2018 with the Korean Intellectual Property Office, the disclosure of which is incorporated herein by reference in its entirety.

TECHNICAL FIELD

The present disclosure relates to a battery module having a plurality of can-type secondary batteries, and more particularly, to a battery module capable of being designed to have a low height while ensuring stable cooling performance, and a battery pack or the like including the battery module.

BACKGROUND ART

Recently, as the demand for portable electronic products such as cameras and portable telephones has increased sharply and the use and development of energy storage batteries, vehicles, robots, satellites, and so on have expanded, a battery pack used therein becomes highly highlighted and actively studied.

A battery module or a battery pack generally contains at least one secondary battery that is also called a cell. In addition, secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. In addition, the lithium secondary battery includes an electrode assembly in which a positive electrode plate coated with the positive electrode active material and a negative electrode plate coated with the negative electrode active material are disposed with a separator being interposed therebetween, and a battery case sealably containing the electrode assembly together with an electrolyte.

Meanwhile, the lithium secondary battery may be classified into a can-type secondary battery in which the electrode assembly is included in a metal can and a pouch-type secondary battery in which the electrode assembly is included in a pouch made of aluminum laminate sheets, depending on the type of the battery case. In addition, the can-type secondary battery may also be classified into a cylindrical battery and a rectangular battery depending on the shape of the metal can. The exterior of the rectangular or cylindrical secondary battery includes a case, namely a battery can, having an open end and a cap assembly sealably coupled to the open end of the battery can.

The battery module may be configured to include a plurality of can-type secondary batteries. At this time, the plurality of can-type secondary batteries are often disposed to stand in an upper and lower direction to facilitate cooling. In the case of a battery module, particularly a battery module for a vehicle, mounted to an electric vehicle or the like, a cooling device is often located in a lower portion of the battery module or below the battery module for cooling the battery module. In this case, if the can-type secondary batteries are provided to stand in the upper and lower direction, the bottoms of all batteries may be connected to the cooling device.

However, if the battery module is configured such that the plurality of can-type secondary batteries stand in the upper and lower direction to facilitate cooling, it is difficult to lower the height of the battery module below a certain level. Some battery modules, especially battery modules for a vehicle, need to be designed to have a low height. Moreover, for most electric vehicles, the battery module is often located at a lower portion of the vehicle. In this case, due to the size or structural limitations of the vehicle, the height of the battery module should be limited to a certain level. However, since the can-type secondary battery generally has a given specification, it is difficult to arbitrarily lower the length, namely the height, of the can-type secondary battery. Thus, if the battery module is configured such that the can-type secondary batteries stand, the height of the battery module cannot be lower than the height of the can-type secondary batteries. In order to lower the height of the battery module than the height of the can-type secondary batteries, it is required to redesign and manufacture secondary batteries accordingly, which however increases the cost and time and thus deteriorates efficiency. In addition, the battery module may have different heights depending on applications, for example vehicles, and it is less desirable to manufacture secondary batteries separately for different vehicles. Thus, the battery module having can-type secondary batteries provided to stand may cause various problems, for example increasing a vehicle height or lowering a vehicle bottom, when being applied to a vehicle.

Meanwhile, in order to lower the height of the battery module, the can-type secondary battery may be configured to lie down in a horizontal direction. However, in this configuration, the can-type secondary batteries stacked at an upper side cannot directly contact the cooling device located under the battery module, except for the can-type secondary battery stacked at a lowermost side. Thus, it is necessary to provide separate a cooling component such as a cooling tube or a cooling fin to a side of the battery module to transfer the heat of each secondary battery to the cooling device. However, in this case, since a separate cooling structure such as a cooling tube or a cooling fin should be provided, the battery module has a complicated structure, needs difficult assembling and has an increased weight, and the energy density is inevitably decreased as much as the space occupied by the cooling component. Moreover, a plurality of battery modules may be arranged in a battery pack in a horizontal direction, and in this case, the above problem may become more serious if a separate cooling component such as a cooling tube or a cooling fin is provided to every battery module.

DISCLOSURE

Technical Problem

The present disclosure is designed to solve the problems of the related art, and therefore the present disclosure is directed to providing a battery module, which may have a low height, ensure stable cooling performance and have a high energy density with an uncomplicated structure without changing the design of a general can-type secondary battery, and a battery pack including the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising: a heat dissipation member disposed at a lower portion of the battery module; a cell assembly having a plurality of can-type secondary batteries stacked in a horizontal direction; and a bus bar comprising a connection part configured to contact electrodes of two or more of the plurality of can-type secondary batteries of the cell assembly to electrically connect the two or more can-type secondary batteries, and a heat transfer part located below the connection part to contact the heat dissipation member and configured to transfer heat of the plurality of can-type secondary batteries to the heat dissipation member, wherein the bus bar is at least partially made of an electrically conductive material.

Here, the bus bar may have a bent plate form, in which the connection part is configured to stand in a vertical direction perpendicular to the horizontal direction and along one side of the cell assembly and the heat transfer part extends in the horizontal direction and is interposed between a lower portion of the cell assembly and an upper portion of the heat dissipation member.

In addition, the bus bar may include a positive electrode bus bar having a connection part contacting a positive electrode of each can-type secondary battery provided in the cell assembly, and a negative electrode bus bar having a connection part contacting a negative electrode of each can-type secondary battery provided in the cell assembly.

In addition, the positive electrode bus bar and the negative electrode bus bar have respective heat transfer parts, the positive electrode bus bar and the negative electrode bus bar may be located at opposite sides of the cell assembly and the heat transfer parts of the positive electrode bus bar and the negative electrode bus bar are bent in opposite directions.

In addition, both the positive electrode bus bar and the negative electrode bus bar may be in contact with a single heat dissipation member.

In addition, the battery module may further include a thermal pad interposed between the heat dissipation member and at least one of the positive electrode bus bar and the negative electrode bus bar, the thermal pad being configured to transfer heat of the bus bar to the heat dissipation member, the thermal pad being made of an electrically insulating material.

In addition, the connection part may further include at least one terminal part having a terminal for electrical connection to an external component.

In addition, the at least one terminal part may be provided at upper portion of the connection part and bent in a direction toward an upper portion of the cell assembly.

In addition, the at least one terminal part includes two or more terminal parts, the two terminal parts may be spaced from each other by a predetermined distance.

In addition, the battery module according to the present disclosure may further comprise a module case including a first case having an empty space formed therein to accommodate a portion of the cell assembly and a second case having an empty space formed therein to accommodate another portion of the cell assembly, and the first case and the second case may be configured to be coupled at one side and an other side of the cell assembly, respectively.

In addition, the bus bar may be attached to an outer side of the module case.

In addition, the module case may have a coupling groove formed therein so that the bus bar is at least partially inserted therein.

In another aspect of the present disclosure, there is also provided a battery pack, comprising the battery module of the present disclosure.

In another aspect of the present disclosure, there is also provided a vehicle, comprising the battery module of the present disclosure.

Advantageous Effects

According to an embodiment of the present disclosure, since the plurality of can-type secondary batteries are arranged in a lying-down form, the battery module may be configured to have a low height by using general secondary batteries without changing the design thereof.

In addition, according to an embodiment of the present disclosure, it is possible to ensure efficient cooling of the battery module even though separate cooling components such as a cooling tube and a cooling fin are not provided to a side of the battery module.

In particular, when a heat dissipation member such as a heatsink, a cooling tube and a heat dissipation fin is provided at a lower portion of the battery module, the heat of all secondary batteries is smoothly transferred to the heat dissipation member, thereby ensuring stable cooling performance of the battery module.

In addition, since a separate cooling component is not required separately, the structure of the battery module is simplified, thereby allowing easy manufacture, reducing weight and manufacturing costs, and increasing an energy density.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
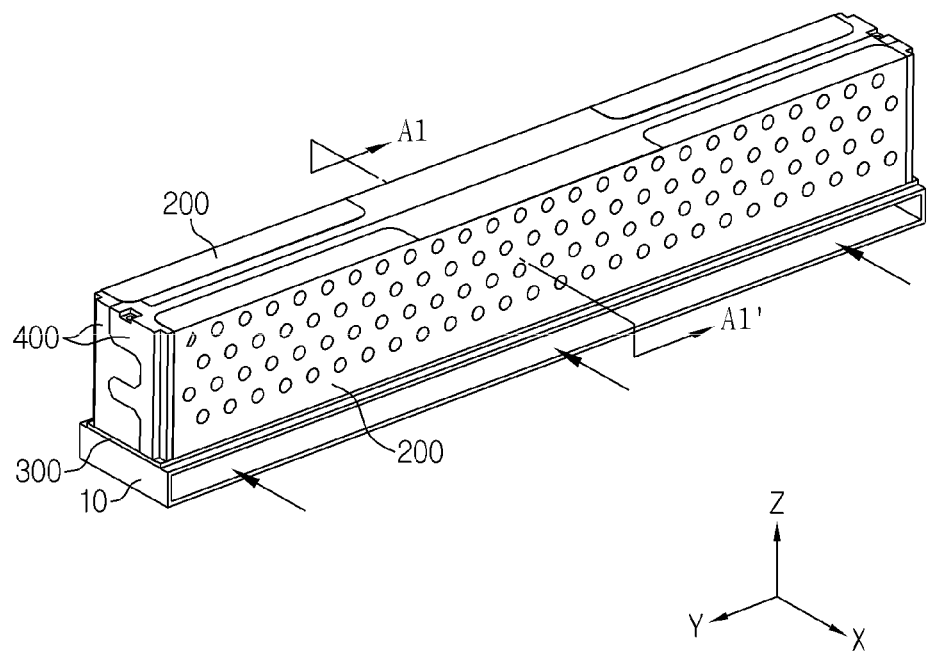
FIG. 1 is a perspective view showing a battery module according to an embodiment of the present disclosure in an assembled state.
Figure 2:
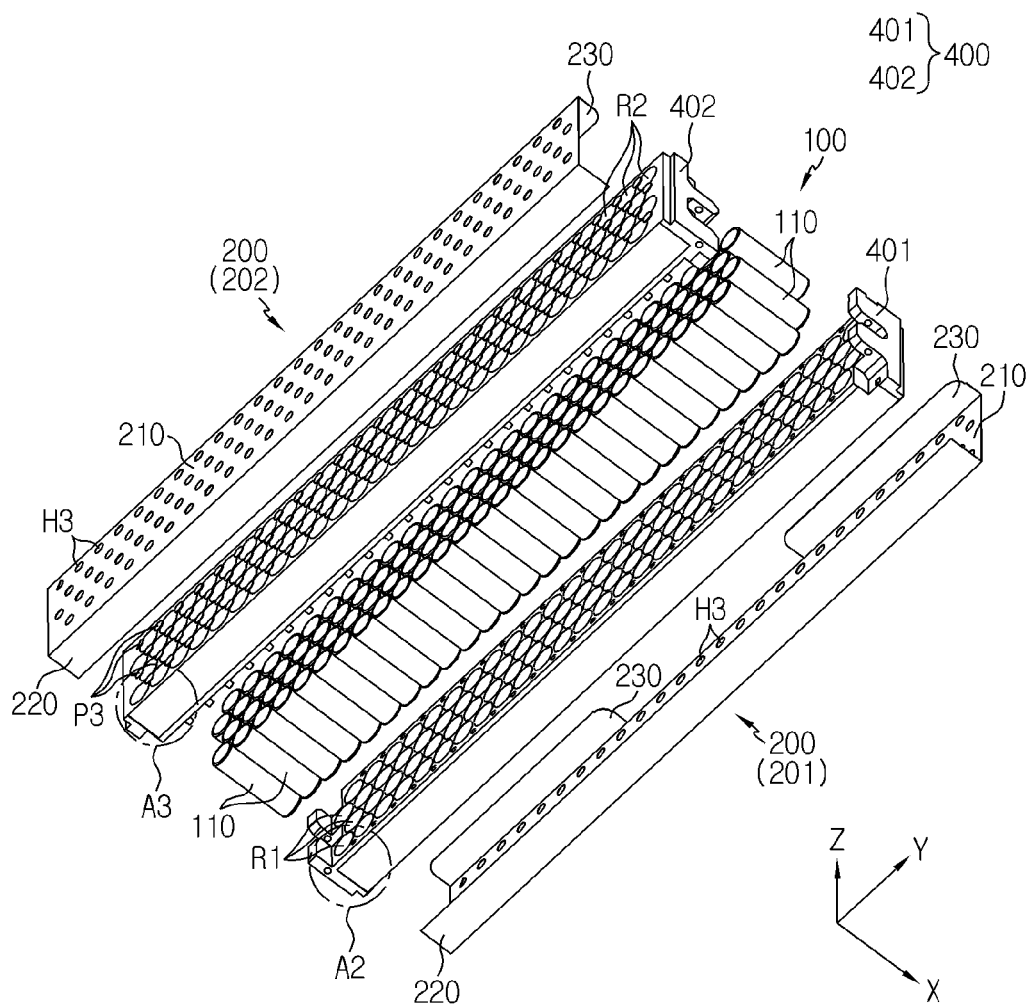
FIG. 2 is an exploded perspective view showing the battery module according to an embodiment of the present disclosure.

FIG. 1 is a perspective view showing a battery module according to an embodiment of the present disclosure in an assembled state, and FIG. 2 is an exploded perspective view showing the battery module according to an embodiment of the present disclosure. In particular, FIG. 2 is a perspective view of the battery module, observed from the below.

Referring to FIGS. 1 and 2, a battery module according to the present disclosure may include a cell assembly 100 and a bus bar 200. In addition, a heat dissipation member 10 may be disposed at a lower portion of the battery module.

As indicated by an arrow FIG. 1, the heat dissipation member 10 may be configured such that a coolant flows in an inner space or a lower space thereof. Here, the coolant may be a liquid or gas such as cooling water or air. The heat dissipation member 10 may absorb the heat of the cell assembly 100 and the bus bar 200 and transfer the heat to the coolant by contacting the coolant. For example, the heat dissipation member 10 may have a heatsink form so that air flows at a lower portion thereof or have a pipe shape so that cooling water or the like flows through a hollow thereof.

The heat dissipation member 10 may be an external component of the battery module, such as a component mounted to a vehicle, as a separate component from the battery module. Alternatively, the heat dissipation member 10 may be included as a component of the battery module.

The cell assembly 100 may include a plurality of can-type secondary batteries 110. Here, the can-type secondary batteries 110 may be configured such that the electrode assembly and the electrolyte are accommodated in a battery case, namely a battery can, and a cap assembly may be coupled to an open end of the battery can.

Figure 3:
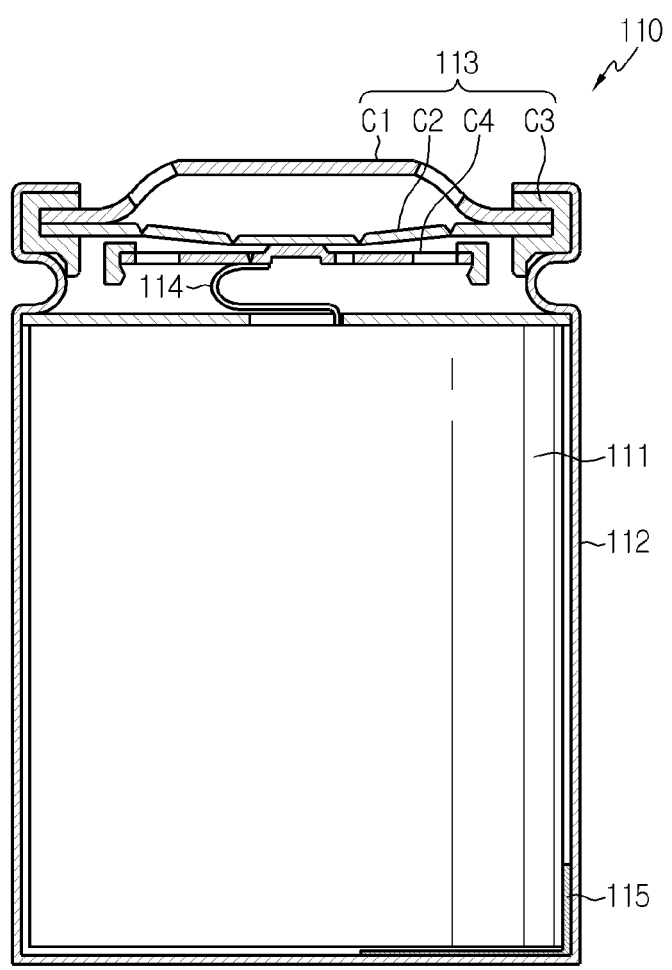
FIG. 3 is a cross-sectioned view schematically showing a can-type secondary battery according to an embodiment of the present disclosure.

FIG. 3 is a cross-sectioned view schematically showing a can-type secondary battery 110 according to an embodiment of the present disclosure.

Referring to FIG. 3, the can-type secondary battery 110 may include an electrode assembly 111, a battery can 112 and a cap assembly 113.

The electrode assembly 111 may have a structure in which a positive electrode plate and a negative electrode plate are wound with a separator being interposed therebetween. A positive electrode tab 114 may be attached to the positive electrode plate and connected to the cap assembly 113, and a negative electrode tab 115 may be attached to the negative electrode plate and connected to a lower end of the battery can 112.

The battery can 112 may have an empty space formed therein to accommodate the electrode assembly 111. In particular, the battery can 112 may have a cylindrical or rectangular shape with a top opening. In addition, the battery can 112 may be made of a metal material such as steel or aluminum to secure rigidity. Moreover, a negative electrode tab may be attached to the lower end of the battery can so that the lower portion of the battery can, or the entire battery can, may function as a negative electrode terminal.

The cap assembly 113 may be coupled to the top opening of the battery can 112 to seal the open end of the battery can. The cap assembly 113 may have a circular or rectangular shape according to the shape of the battery can and may include components such as a top cap c1, a safety vent c2 and a gasket c3.

Here, the top cap c1 may be located at the top of the cap assembly and protrude upward. In particular, the top cap may serve as a positive electrode terminal at the can-type secondary battery 110. Thus, the top cap may be electrically connected to an external device, such as another secondary battery, a load and a charging device through a bus bar. The top cap may be made of a metal material such as stainless steel or aluminum for example.

The safety vent c2 may be configured to deform its shape if the internal pressure of the secondary battery, namely the internal pressure of the battery can, increases above a certain level. In addition, the gasket c3 may be made of a material with electric insulation so that rim portions of the top cap and the safety vent may be insulated from the battery can.

Meanwhile, the cap assembly may further include a current interrupt member c4. The current interrupt member is also referred to as CID (Current Interrupt Device). If the internal pressure of the battery increases due to gas generation so that the shape of the safety vent is inverted, the contact between the safety vent and the current interrupt member is cut off or the current interrupt member is broken, thereby interrupting the electrical connection between the safety vent and the electrode assembly.

The configuration of the can-type secondary battery 110 is well known to those skilled in the art at the time of filing of this application and thus is not described in detail herein. In addition, even though FIG. 3 shows an example of the can-type secondary battery, the battery module according to the present disclosure is not limited to any specific can-type secondary battery. That is, various secondary batteries known at the time of filing of this application may be employed as the battery module according to the present disclosure.

Further, even though the can-type secondary battery 110 of FIG. 3 is shown based on a cylindrical secondary battery, a rectangular secondary battery may also be applied as the battery module according to the present disclosure.

The cell assembly 100 may be configured such that a plurality of can-type secondary batteries 110 are stacked therein. For example, the plurality of can-type secondary batteries 110 may be arranged in a horizontal direction. In addition, the plurality of can-type secondary batteries 110 may be arranged in an upper and lower direction. Further, the plurality of can-type secondary batteries 110 may be stacked in so that their side surfaces face a curved surface of the cylindrical battery can.

In particular, in the battery module according to the present disclosure, the plurality of can-type secondary batteries 110 of the cell assembly 100 may lie down in a horizontal direction. That is, as shown in FIG. 2, each can-type secondary battery 110 may be configured to extend in a right and left direction (in the x-axis direction on the drawing). At this time, the positive electrode terminal and the negative electrode terminal of each can-type secondary battery 110 may be located at left or right sides.

According to this configuration of the present disclosure, the battery module may have a reduced height. That is, if the can-type secondary battery 110 is laid down, the battery module may be configured to have a height shorter than the length of the can-type secondary battery. Thus, it is easy to design a battery module with a low height.

The bus bar 200 may electrically connect the plurality of can-type secondary batteries provided in the cell assembly 100 to each other, for example all of the secondary batteries or some secondary batteries to each other. For this, at least a portion of the bus bar 200 may be made of an electrically conductive material. For example, the bus bar 200 may be made of a metal material such as copper, aluminum or nickel.

In particular, in the present disclosure, the bus bar 200 may include a connection part 210 and a heat transfer part 220 as shown in FIG. 2.

The connection part 210 may electrically connect two or more can-type secondary batteries 110 provided in the cell assembly 100. For this purpose, the connection part 210 may contact electrodes of two or more can-type secondary batteries 110 provided in the cell assembly 100. For example, the connection part 210 may contact the electrodes of all the secondary batteries 110 provided in the cell assembly 100 to electrically connect all the secondary batteries 110 to each other. Further, the connection part 210 may contact the same polarity of the two or more can-type secondary batteries 110 provided in the cell assembly 100 to connect them in parallel. Alternatively, the connection part 210 may contact the electrodes of some secondary batteries among all the secondary batteries provided in the cell assembly 100 to electrically connect them to each other.

The heat transfer part 220 may be located below the connection part 210. In addition, the heat dissipation member 10 may be disposed below the heat transfer part 220. The heat transfer part 220 may transfer heat to this heat dissipation member 10. That is, the heat generated from the secondary battery of the cell assembly 100 may be transferred to the connection part 210, and the heat transfer part 220 may transfer the heat of the secondary battery, transferred to the connection part 210, to the heat dissipation member 10. Further, the heat transfer part 220 may contact the heat dissipation member 10 to transfer heat in a conductive manner.

Figure 4:
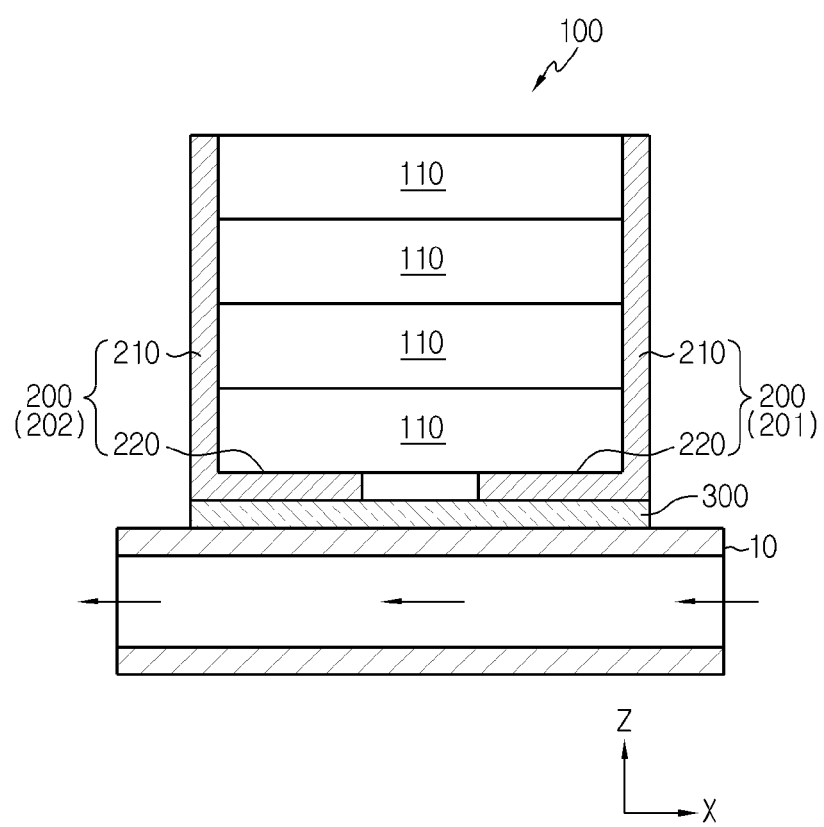
FIG. 4 is a diagram schematically showing a heat transfer configuration of the battery module according to an embodiment of the present disclosure.

FIG. 4 is a diagram schematically showing a heat transfer configuration of the battery module according to an embodiment of the present disclosure. For example, FIG. 4 may be regarded as schematically showing a sectional configuration, taken along the line A1-A1' of FIG. 1. However, FIG. 4 does not depict all components of FIG. 1 but shows just some components for convenience. Meanwhile, in FIG. 4, the arrow represents a heat transfer path.

Referring to FIG. 4, the heat generated from the secondary batteries stacked in the upper and lower direction on the ground may be moved in the horizontal direction (the right and left direction on the drawing) and then transferred to the connection part 210 located at the side of the secondary batteries and standing vertically with respect to the ground. In addition, the heat transferred to the connection part 210 may be moved downward and transferred to the heat transfer part 220 therebelow. Moreover, the heat transfer part 220 is in direct or indirect contact with the heat dissipation member 10 therebelow. Thus, the heat of the heat transfer part 220 may be transferred to the heat dissipation member 10 and then discharged out through the coolant.

In this configuration of the present disclosure, the bus bar 200 may electrically connect and cool the secondary batteries simultaneously. In other words, if the bus bar 200 according to the present disclosure is used, it is possible to electrically connect a plurality of secondary batteries to each other by the connection part 210, and also it is possible to cool the secondary batteries by transferring the heat of the secondary batteries to the heat dissipation member 10 by the heat transfer part 220.

Further, if all the secondary batteries provided in the cell assembly 100 are connected to the connection part 210, the heat of each secondary battery may be conducted to the connection part 210, and the heat conducted to the connection part 210 may be conducted to the heat transfer part 220 and the heat dissipation member 10 and then discharged out through the coolant. In this case, since the heat of all secondary batteries provided in the cell assembly 100 may be discharged out by conduction, each secondary battery may be cooled effectively. Thus, according to this configuration, there is no need to provide a cooling component separately between the secondary batteries. Therefore, the battery module may have an uncomplicated structure, reduced weight and volume, and an improved energy density.

The bus bar 200 may have a plate shape. Moreover, the bus bar 200 may be configured in a metal plate form to ensure rigidity and electrical conductivity. In particular, in the present disclosure, the bus bar 200 may be configured in a bent plate form.

For example, as shown in FIGS. 1 and 2, the bus bar 200 may have a plate form whose lower end is bent by about 90 degrees. In this case, based on the bent portion, the upper portion of the bus bar 200 may serve as the connection part 210, and the lower portion may serve as the heat transfer part 220.

In particular, the connection part 210 may be configured to stand in the upper and lower direction (in the z-axis direction on the drawing) along one side of the cell assembly 100, for example a left or right side of the cell assembly 100. That is, in the present disclosure, if the can-type secondary batteries of the cell assembly 100 are stacked in the front and rear direction (in the y-axis direction on the drawing) and/or in the upper and lower direction (in the z-axis direction on the drawing) in a form of lying down long in the right and left direction (in the x-axis direction on the drawing), the electrodes of several secondary batteries may be arranged in parallel in the front and rear direction and the upper and lower direction. Thus, the connection part 210 having a flat shape is configured to stand flat in the front and rear direction and the upper and a lower direction, so that the connection part 210 may be in direct contact with the electrodes of several secondary batteries.

In addition, the heat transfer part 220 may be configured to lie down in a horizontal direction. For example, the heat transfer part 220 may be configured such that its surface is parallel to the x-y plane. In this case, as shown in FIG. 4, the heat transfer part 220 may be interposed between a lower portion of the cell assembly 100 and an upper portion of the heat dissipation member 10.

The connection part 210 and the heat transfer part 220 may be configured as a single plate, for example a single metal plate, which is bent. In this case, the bus bar 200 may ensure easy manufacture and simple structure.

Meanwhile, each secondary battery provided in the cell assembly 100 may include a positive electrode and a negative electrode. The bus bar 200 may have at least two bus bars 200 to connect the positive electrode and the negative electrode of the secondary battery, respectively. That is, the bus bar 200 may include a positive electrode bus bar 201 and a negative electrode bus bar 202.

Here, the connection part 210 of the positive electrode bus bar 201 may be in contact with the positive electrode (the positive electrode terminal) of the can-type secondary battery provided in the cell assembly 100. Thus, the positive electrode bus bar 201 may electrically connect positive electrodes of several can-type secondary batteries to each other. The connection part 210 of the negative electrode bus bar 202 may be in contact with the negative electrode (the negative electrode terminal) of the can-type secondary battery provided in the cell assembly 100. Thus, the negative electrode bus bar 202 may electrically connect negative electrodes of several can-type secondary batteries to each other.

For example, seeing the configuration of FIG. 2, two bus bars may be disposed at the side of the cell assembly 100. At this time, one bus bar may be the positive electrode bus bar 201 and the other bus bar may be the negative electrode bus bar 202. In addition, the positive electrodes of all the can-type secondary batteries provided in the cell assembly 100 may be in contact with the positive electrode bus bar 201 and be connected to each other, and the negative electrodes of all the can-type secondary batteries provided in the cell assembly 100 may be in contact with the negative electrode bus bar 202 and be contacted to each other.

Preferably, the positive electrode bus bar 201 and the negative electrode bus bar 202 may be positioned at opposite sides based on the cell assembly 100.

Each can-type secondary battery provided in the cell assembly 100 may be formed to extend in one direction. In addition, each can-type secondary battery may have a positive electrode terminal and a negative electrode terminal disposed at opposite sides thereof in the longitudinal direction. In particular, the plurality of can-type secondary batteries may be disposed in a lying-down form, namely in a form where their longitudinal direction becomes a horizontal direction, so that the positive electrode terminals and the negative electrode terminals are positioned at both ends thereof in the horizontal direction. Further, the plurality of can-type secondary batteries may be disposed such that the positive electrode terminals thereof are located at the same side and the negative electrode terminals are located at the same side. Thus, the positive electrode bus bar 201 and the negative electrode bus bar 202 may be located at opposite sides based on the secondary batteries.

For example, as shown in FIG. 2, the secondary battery may be formed to elongate in the right and left direction (in the x-axis direction), so that the positive electrode terminal and the negative electrode terminal are disposed at the right and left sides of the secondary battery, respectively. Thus, the positive electrode bus bar 201 may be disposed at the right side of the cell assembly 100, and the negative electrode bus bar 202 may be disposed at the left side of the cell assembly 100.

In this case, the positive electrode bus bar 201 and the negative electrode bus bar 202 may be configured such that the heat transfer parts 220 are bent in opposite directions. In other words, the lower ends of the positive electrode bus bar 201 and the negative electrode bus bar 202 may be bent so as to be defined as the connection part 210 and the heat transfer part 220 based on the bent portion. At this time, the positive electrode bus bar 201 and the negative electrode bus bar 202 may be bent in opposite directions.

For example, in FIG. 2, the lower end of the positive electrode bus bar 201 may be bent in the left direction (in the −x-axis direction). In addition, the lower end of the negative electrode bus bar 202 may be bent in the right direction (in the +x-axis direction). That is, the lower ends of the positive electrode bus bar 201 and the negative electrode bus bar 202 may be bent toward each other, namely in a direction in which the lower ends become close to each other. By means of this bending configuration, the heat transfer parts 220 of the positive electrode bus bar 201 and the negative electrode bus bar 202 may be interposed between the cell assembly 100 and the heat dissipation member 10 as shown in FIG. 4. In particular, the connection part 210 of the positive electrode bus bar 201 and the connection part 210 of the negative electrode bus bar 202 may be spaced apart from each other by a predetermined distance in the longitudinal direction (in the x-axis direction) of the secondary battery to be in parallel to each other. In addition, the heat transfer part 220 of the positive electrode bus bar 201 and the heat transfer part 220 of the negative electrode bus bar 202 may be configured to be placed on a single plane in a lying down state where both surfaces thereof face upward and downward.

According to this configuration of the present disclosure, the gap between the cell assembly 100 and the heat dissipation member 10 may be narrowed, and the heat transfer parts 220 of both the positive electrode bus bar 201 and the negative electrode bus bar 202 may be in contact with a single heat dissipation member 10. Thus, in this case, the battery module may have a reduced volume, a simplified cooling configuration and further improved cooling efficiency.

Meanwhile, for the simplified and efficient cooling configuration, the positive electrode bus bar 201 and the negative electrode bus bar 202 may be in contact with a single heat dissipation member 10. In this case, the battery module according to the present disclosure may further include a thermal pad 300.

The thermal pad 300 may be interposed between at least one of the positive electrode bus bar 201 and the negative electrode bus bar 202 and the heat dissipation member 10. For example, as shown in FIGS. 1 and 4, the lower surfaces of the heat transfer parts 220 of the positive electrode bus bar 201 and the negative electrode bus bar 202 may be in contact with the upper surface of the same heat dissipation member 10.

In addition, the thermal pad 300 may transfer the heat of the bus bar to the heat dissipation member 10. Accordingly, the thermal pad 300 may be made of a thermally conductive material.

However, the thermal pad 300 may be made of an electrically insulating material through which an electric current does not substantially flow, in order to prevent a short circuit between the positive electrode bus bar 201 and the negative electrode bus bar 202. Further, the heat dissipation member 10 may be made of a metal or the like, and even in this case, the thermal pad 300 may prevent the positive electrode bus bar 201 and the negative electrode bus bar 202 from being connected by the heat dissipation member 10 and thus causing a short circuit.

As described above, the thermal pad 300 may be made of a material with thermal conductivity and electrical insulation. For example, the thermal pad 300 may be made of silicon, acryl or the like.

Also preferably, the heat transfer part 220 may have a protrusion formed at a lower portion thereof. This will be described below in more detail with reference to FIG. 5.

Figure 5:
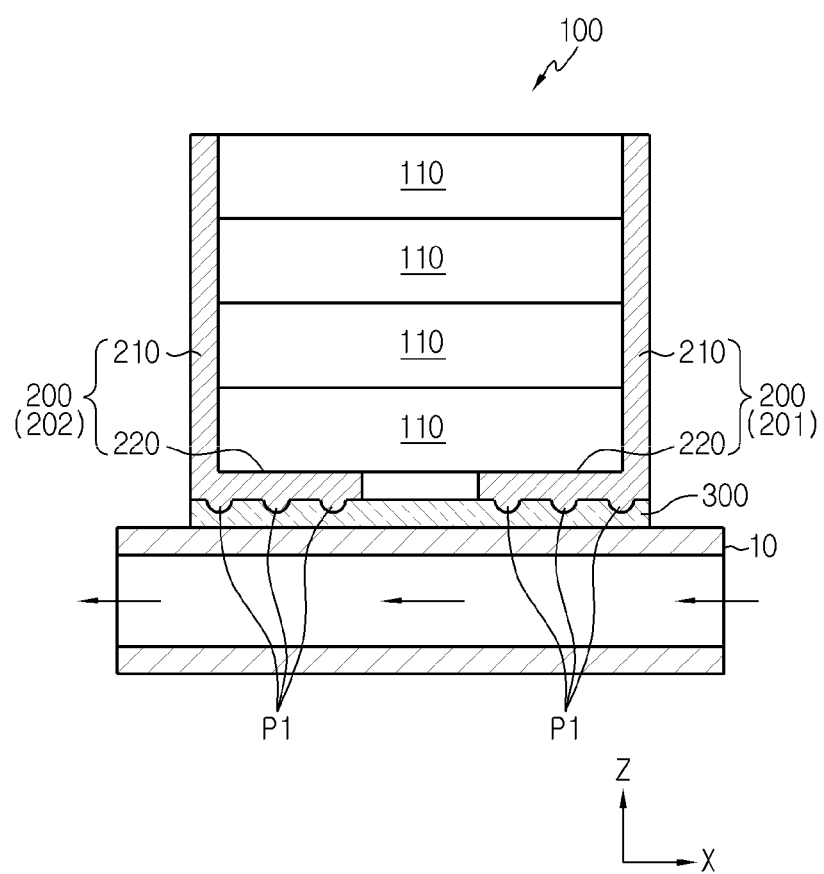
FIG. 5 is a cross-sectioned view schematically showing a battery module according to another embodiment of the present disclosure.

FIG. 5 is a cross-sectioned view schematically showing a battery module according to another embodiment of the present disclosure. In particular, FIG. 5 may be regarded as a modified example of FIG. 4.

Referring to FIG. 5, a plurality of protrusions may be formed at the heat transfer part 220, as indicated by P1. The protrusions P1 may protrude downward at a lower portion of the heat transfer part 220. In particular, a plurality of protrusions P1 may be provided at a single bus bar. For example, a plurality of protrusions P1 may be provided at the bottom surface of the heat transfer part 220 of the positive electrode bus bar 201, and a plurality of protrusions P1 may be provided at the bottom surface of the heat transfer part 220 of the negative electrode bus bar 202.

In addition, the plurality of protrusions P1 may be spaced apart by a predetermined distance from each other at each bus bar. For example, as shown in FIG. 5, the plurality of protrusions P1 may be spaced apart from each other by a predetermined distance in the right and left direction (in the x-axis direction) at the bottom surface of the heat transfer part 220 of each bus bar. Alternatively, the plurality of protrusions P1 may be spaced apart from each other by a predetermined distance in the front and rear directions (in the y-axis direction of FIG. 1) at the bottom surface of the heat transfer part 220 of each bus bar.

According to this configuration of the present disclosure, the lower surface area of the heat transfer part 220 of each bus bar is increased to improve the cooling efficiency by the heat transfer part 220. In particular, the thermal pad 300 may be made of a flexible material. Accordingly, in this case, even though unevenness is formed at the surface of the heat transfer part 220 by the protrusions P1, the shape of the upper surface of the thermal pad 300 may be changed according to the uneven shape as shown in FIG. 5. Thus, the contact area between the bus bar and the thermal pad 300 is increased by means of the protrusions P1 of the heat transfer part 220, so that the amount of heat transferred from the bus bar to the heat dissipation member 10 through the thermal pad 300 may be increased. In addition, since the frictional force and the contact area between the heat transfer part 220 and the thermal pad 300 are increased by the protrusions P1, the coupling between the bus bar and the thermal pad 300 may be improved.

Further, in the configuration where the protrusions are formed at the lower portion of the heat transfer part 220, insert grooves (not shown) located and sized corresponding to the protrusions of the heat transfer part 220 may be formed at the upper portion of the heat dissipation member 10. According to this configuration, as the protrusions P1 of the bus bar are inserted into the insert grooves of the heat dissipation member 10, the coupling between the bus bar and the heat dissipation member 10 may be increased. In addition, in this case, the upper surface area of the heat dissipation member 10 is increased to transfer a greater amount of heat from the bus bar to the heat dissipation member 10 per unit time, thereby further improving the cooling efficiency.

Also preferably, in the positive electrode bus bar 201, the connection part 210 may have a concave portion conforming to the shape of the positive electrode of the can-type secondary battery. This will be described below in more detail with reference to FIG. 6.

Figure 6:
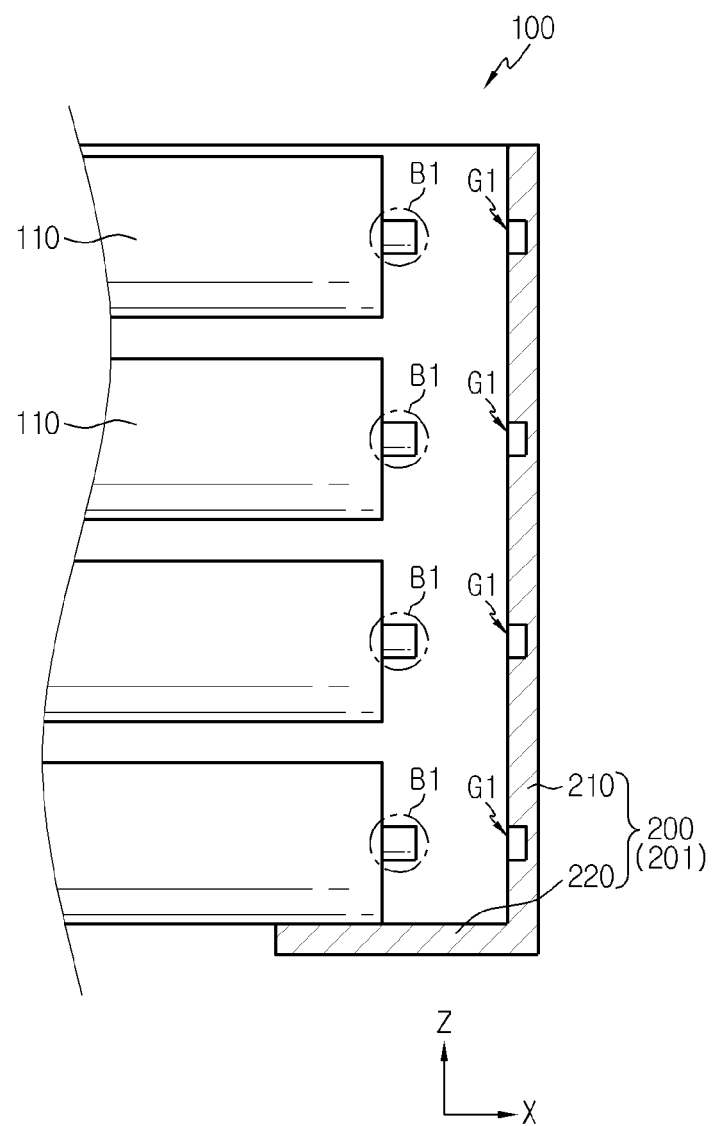
FIG. 6 is a cross-sectioned view schematically showing that a positive electrode bus bar according to an embodiment of the present disclosure is separated from the cell assembly.

FIG. 6 is a cross-sectioned view schematically showing that the positive electrode bus bar 201 according to an embodiment of the present disclosure is separated from the cell assembly 100.

Referring to FIG. 6, the positive electrode terminal provided at the right end of each secondary battery provided in the cell assembly 100 may be configured to protrude in the right direction, as indicated by B1. The protruding portion may serve as the top cap c1 in the configuration depicted in FIG. 3. In this configuration, the positive electrode bus bar 201 provided at the right side of the cell assembly 100 and in contact with the positive electrodes of the plurality of secondary batteries may have a concave portion recessed in the right direction as indicated by G1 at the inner surface thereof, namely at the left surface thereof. In addition, a positive electrode terminal B1 of each secondary battery may be inserted into the concave portion, when the battery module is constructed. For this, the location, number and shape of the concave portion G1 may be selected corresponding to the positive electrode terminals of the secondary batteries provided in the cell assembly 100. For example, as shown in FIG. 6, when four secondary batteries are stacked in the upper and lower direction so that four positive electrode terminals are provided to be spaced apart by a predetermined distance in the upper and lower direction, four concave portions may also be formed at the positive electrode bus bar 201 to be spaced apart by a predetermined distance in the upper and lower direction.

According to this configuration of the present disclosure, the coupling between the cell assembly 100 and the positive electrode bus bar 201 may be improved. That is, as the positive electrode terminal of each secondary battery provided in the cell assembly 100 is inserted into the concave portion G1 of the positive electrode bus bar 201, the coupling between the secondary battery and the positive electrode bus bar 201 is improved, and it is possible to prevent vertical or lateral movement thereof. In addition, since the coupling position of the secondary battery and the positive electrode bus bar 201 is guided by the concave portion G1, the cell assembly 100 and the positive electrode bus bar 201 may be assembled more easily.

Further, according to this configuration of the present disclosure, the contact area between the positive electrode terminal of the secondary battery and the positive electrode bus bar 201 may be increased. For example, in the sectional configuration of FIG. 6, the concave portion of the positive electrode bus bar 201 may have approximately three inner sides (upper, lower and right sides), and the positive electrode terminal of the secondary battery may be in contact with all of three inner sides. If the contact area between the positive electrode terminal of the secondary battery and the positive electrode bus bar 201 is increased as above, the area of transferring heat from the positive electrode of the secondary battery to the positive electrode bus bar 201 is increased, thereby further improving the cooling performance of the secondary battery through the bus bar. In addition, as the contact area between the positive electrode of the secondary battery and the positive electrode bus bar 201 is increased, an electrical path may be enlarged to reduce the electrical resistance.

In this configuration, the depth of the concave portion G1 is preferably smaller than the protruding length of the positive electrode terminal B1. For example, in FIG. 6, the length of the positive electrode terminal B1 in the right and left direction may be longer than the length of the concave portion G1 in the right and left direction. In the can-type secondary battery, the battery can itself may function as a negative electrode, and thus it is desirable that the positive electrode bus bar 201 is not in contact with the battery can when the positive electrode terminal is inserted into the concave portion.

Also preferably, in the negative electrode bus bar 202, the connection part 210 may have a convex portion corresponding to the appearance of the can-type secondary battery.

Figure 7:
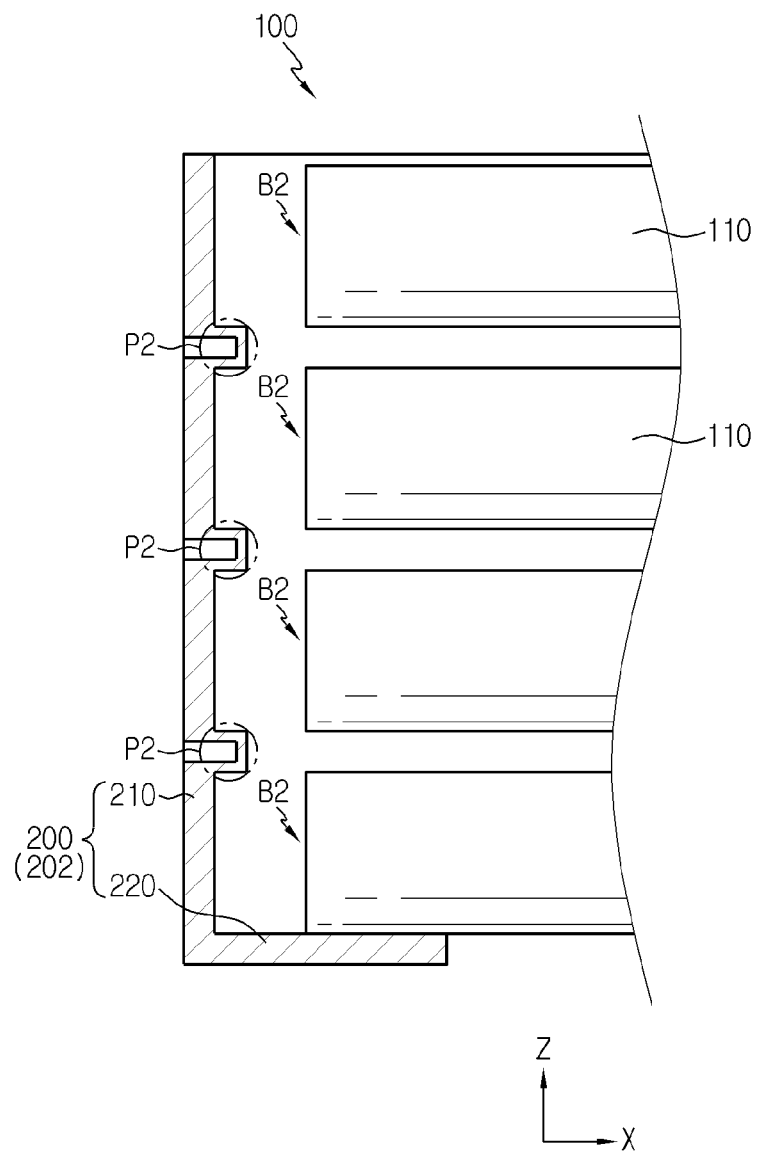
FIG. 7 is a cross-sectioned view schematically showing that a negative electrode bus bar according to an embodiment of the present disclosure is separated from the cell assembly.

FIG. 7 is a cross-sectioned view schematically showing that the negative electrode bus bar 202 according to an embodiment of the present disclosure is separated from the cell assembly 100.

Referring to FIG. 7, the negative electrode terminal provided at the left end of each secondary battery provided in the cell assembly 100 may have a substantially flat shape as indicated by B2. In addition, the negative electrode bus bar 202 may have a convex portion formed at an inner surface thereof to protrude inward, namely toward the secondary battery (in the right direction on the drawing), as indicated by P2.

The convex portion P2 may be located between the secondary batteries and be interposed between the secondary batteries when the negative electrode bus bar 202 and the cell assembly 100 are coupled. For example, in FIG. 7, the convex portion may be interposed in the space between the secondary batteries stacked in upper and lower direction. In this case, it may be regarded that the end of the battery can of the secondary battery near the negative electrode is inserted into the space between the convex portions P2.

According to this configuration of the present disclosure, the coupling between the secondary battery and the negative electrode bus bar 202 may be enhanced, and the assembling locations of the secondary battery and the negative electrode bus bar 202 may be easily guided. Moreover, the contact area between the negative electrode terminal of the secondary battery and the negative electrode bus bar 202 may be enlarged to increase the amount and speed of heat transferred from the secondary battery to the negative electrode bus bar 202. In particular, as shown in FIG. 3, in the can-type secondary battery, the battery can 112 may function as a negative electrode terminal not only in the lower portion thereof but also in the side portion thereof. Thus, if a part of the battery can is inserted into the space between the convex portions of the negative electrode bus bar 202, the heat may be transferred to the negative electrode bus bar 202 not only at the lower surface of the battery can (the planar lower surface of the cylindrical battery can) but also at a part of the side surface of the battery can (the curved side surface of the cylindrical battery can). Thus, in this case, the heat transfer area may be increased. In addition, as the contact area between the negative electrode terminal of the secondary battery and the negative electrode bus bar 202 is increased, the electrical path may be expanded to reduce the electrical resistance.

Meanwhile, the electrode terminal of the secondary battery may be in direct contact with the bus bar. In this case, in order to stably maintain the contact state between the electrode terminal of the secondary battery and the bus bar, the electrode of the secondary battery and the bus bar may be fixed in contact to each other by means of welding or the like. In particular, as in the configuration of FIGS. 6 and 7, if the concave portion G1 or the convex portion P2 is formed at the connection part 210 of the bus bar, the secondary battery and the bus bar are primarily fixed before welding, thereby improving the welding process between the secondary battery and the bus bar. Further, in the portion where the concave portion G1 is formed at the positive electrode bus bar 201, the length (width) of the positive electrode bus bar 201 in the right and left direction is decreased, so that the fixing force by welding may be further improved.

In addition, the heat transfer part 220 of the bus bar may be in contact with the lower portion of the can-type secondary battery stacked at the lowermost side in the cell assembly 100. In this case, the heat of the secondary battery stacked at the lowermost side may be directly transferred to the heat transfer part 220 without passing through the connection part 210, thereby further improving the cooling performance of the cell assembly 100.

Also preferably, the bus bar may further include a terminal part 230 as shown in FIG. 2.

The terminal part 230 may provide a terminal for electrical connection with an external component. The terminal part 230 may be disposed at an upper portion of the connection part 210 and protrude from the connection part 210.

In particular, the terminal part 230 may be integrated with the connection part 210 of the secondary battery. For example, the terminal part 230, the connection part 210 and the heat transfer part 220 may be formed using a single metal plate.

More preferably, the terminal part 230 may be formed by bending an upper portion of the connection part 210. For example, as shown in FIGS. 1 and 2, the terminal part 230 may be configured to be bent at an angle of about 90 degrees from the upper portion of the connection part 210 toward the upper portion of the cell assembly 100. In particular, the bus bar 200 may be configured using a single metal plate whose upper and lower portions are bent, so as to be divided into the connection part 210, the heat transfer part 220 and the terminal part 230 based on the bent portion (the folding line).

The terminal part 230 may be provided at both the positive electrode bus bar 201 and the negative electrode bus bar 202. In addition, the terminal part 230 of the positive electrode bus bar 201 and the terminal part 230 of the negative electrode bus bar 202 may be bent in opposite directions toward each other.

For example, as shown in FIG. 2, the terminal part 230 bent in the left direction may be formed at the upper portion of the positive electrode bus bar 201 disposed at the right side of the cell assembly 100. In addition, the terminal part 230 bent in the right direction may be formed at the upper portion of the negative electrode bus bar 202 disposed at the left side of the cell assembly 100.

Also preferably, two or more terminal parts 230 may be provided at a single bus bar to be spaced apart from each other by a predetermined distance.

For example, as shown in FIG. 1, the positive electrode bus bar 201 and the negative electrode bus bar 202 may be disposed at the right and left sides of the battery module, respectively. Here, two terminal parts 230 may be provided at the upper portion of the positive electrode bus bar 201, and two terminal parts 230 may also be provided at the upper portion of the negative electrode bus bar 202. In addition, the terminal parts 230 may be spaced from each other by a predetermined distance at each bus bar. For example, two terminal parts 230 provided at the upper portion of the positive electrode bus bar 201 may be spaced apart from each other by a predetermined distance in the front and rear direction (in the y-axis direction on the drawing).

According to this configuration of the present disclosure, as the plurality of terminal parts 230 are formed at the same bus bar, the bus bar may be connected to an external device in various ways. That is, even though a connection terminal of a device to which the battery module is applied approaches in any direction, an appropriate terminal part 230 may be selectively used depending on the situation. Thus, when the battery module is used for assembling, it is possible to improve the assembling and simplify the structure.

In particular, if a plurality of terminal parts 230 are formed at a single bus bar, some of the terminal parts 230 may be configured to stand up. This will be described below in more detail with reference to FIG. 8.

Figure 8:
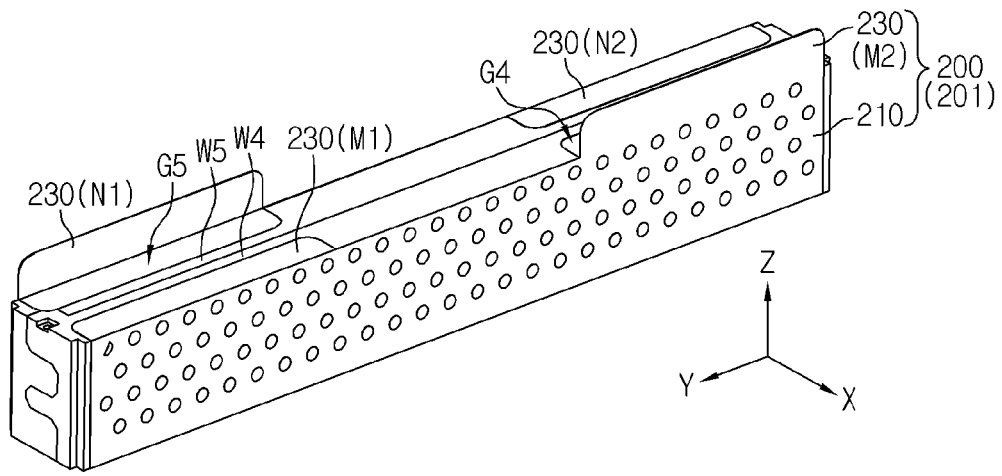
FIG. 8 is a perspective view schematically showing some terminal parts of the bus bar are provided to stand, in the battery module according to an embodiment of the present disclosure.

FIG. 8 is a perspective view schematically showing some terminal parts 230 of the bus bar are provided to stand, in the battery module according to an embodiment of the present disclosure.

Referring to FIG. 8, the positive electrode bus bar 201 and the negative electrode bus bar 202 may respectively have two terminal parts 230 separated by a predetermined distance in the front and rear direction (in the y-axis direction). At this time, two terminal parts 230 of the positive electrode bus bar 201 are indicated by M1 and M2, respectively, and two terminal parts 230 of the negative electrode bus bar 202 are indicated by N1 and N2, respectively.

In this configuration, the positive electrode bus bar 201 may be configured such that the terminal part M1 located on at front side is laid down and the terminal part M2 located at the rear side stands up. That is, the terminal part M1 of the positive electrode bus bar 201 may be configured to be bent at about 90 degrees from the connection part 210 toward the upper portion of the cell assembly 100, and the terminal part M2 may be configured to stand in the upper and lower direction (in the z-axis direction) substantially parallel to the connection part 210.

In addition, in the configuration, the negative electrode bus bar 202 may be configured such that the terminal part N1 located at the front side stands and the terminal part N2 located at the rear side lies down. That is, the terminal part N1 of the negative electrode bus bar 202 may be configured to stand in the upper and lower direction substantially parallel to the connection part 210, and the terminal part N2 may be configured to be bent at about 90 degrees from the connection part 210 toward the upper portion of the cell assembly 100.

According to this configuration of the present disclosure, the battery module may be connected to an external device though the standing terminal part, among the plurality of terminal parts of the bus bar. As described above, the connection terminal of an external device may more easily access and be coupled to the standing terminal parts.

Moreover, in this case, the positive electrode bus bar 201 and the negative electrode bus bar 202 may be separated more easily. Specifically, when the plurality of terminal parts 230 of each bus bar are arranged to be spaced apart by a predetermined distance along the longitudinal direction of the battery module, for example along the front and rear direction of the battery module, at the positive electrode bus bar 201 and the negative electrode bus bar 202, the standing terminal parts may be located at different positions in the front and rear direction of the battery module.

For example, in FIG. 8, the terminal parts of the positive electrode bus bar 201 and the negative electrode bus bar 202 are spaced by a predetermined distance in the front and rear direction (in the y-axis direction) of the battery module. Here, the negative electrode bus bar 202 may be configured such that the terminal part N1 located at the front side stands, and the positive electrode bus bar 201 may be configured such that the terminal part M2 located at the rear side stands. In addition, the terminal part N2 located at the rear side of the negative electrode bus bar 202 and the terminal part M1 located at the front side of the positive electrode bus bar 201 may be configured to be laid down.

In this case, the terminal part N1 at the front side of the negative electrode bus bar 202 and the terminal part M2 at the rear side of the positive electrode bus bar 201 may be regarded as serving as the terminal parts of the negative electrode bus bar 202 and the positive electrode bus bar 201, respectively. Thus, when a battery pack is constructed using the battery module, the terminal of the negative electrode bus bar 202 and the terminal of the positive electrode bus bar 201 for connecting battery modules to each other or to an external device may be regarded as serving as the terminal parts N1 and M2, respectively.

In the positive electrode bus bar 201 and the negative electrode bus bar 202, the plurality of terminal parts may be configured to be bendable. That is, a user may selectively fold or spread some of the plurality of terminal parts of the positive electrode bus bar 201 and the negative electrode bus bar 202 in the battery module according to the present disclosure. Thus, depending on the situation where the battery module is applied, terminal parts may adequately stand or lie down.

If the terminal parts of the bus bar are configured to be bendable as described above, the terminal parts may be connected more easily, and the positive electrode bus bar 201 and the negative electrode bus bar 202 may be separated more easily.

Figure 9:
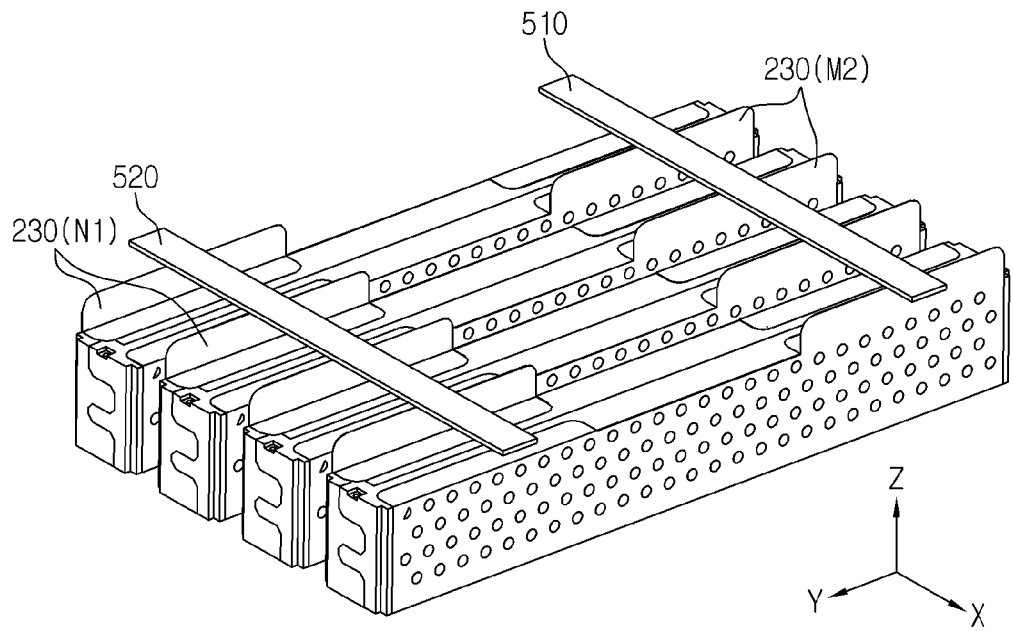
FIG. 9 is a diagram schematically showing that a plurality of battery modules according to an embodiment of the present disclosure are connected.

FIG. 9 is a diagram schematically showing that a plurality of battery modules according to an embodiment of the present disclosure are connected.

Referring to FIG. 9, a plurality of battery modules according to the present disclosure may be arranged in the lateral horizontal direction (in the x-axis direction), namely in the right and left direction. At this time, the positive electrode bus bar 201 and the negative electrode bus bar 202 of each battery module may be configured such that the connection parts 210 thereof face each other. In addition, in each battery module, as shown in FIG. 8, the negative electrode bus bar 202 may be configured such that the terminal part at the front side stands, and the positive electrode bus bar 201 may be configured such that the terminal part at the rear side stands. Moreover, the standing terminal part at the front side of the negative electrode may be connected to the connection member 520 for the negative electrode, and the standing terminal part at the rear side of the positive electrode may be connected to the connection member 510 for the positive electrode.

According to this configuration, the plurality of battery modules may be connected in parallel easily. That is, as shown in FIG. 9, the terminal parts of the negative electrode connected to each other in each battery module may be arranged in a row at the front side of the battery module, and the terminal parts of the positive electrode connected to each other may be arranged in a row at the rear side of the battery module. Thus, the connection member 520 for the negative electrode, which connects the terminal parts of the negative electrode, and the connection member 510 for the positive electrode, which connects the terminal parts of the positive electrode, may be all formed in a substantially straight line form. In addition, the distance between the connection member 520 for the negative electrode and the connection member 510 for the positive electrode may be secured to a certain level or more. In addition, when the connection member 510 for the negative electrode is installed, the connection member 510 may not be structurally interfered with the positive electrode terminal, and when the connection member 520 for the positive electrode is installed, the connection member 520 may not be structurally interfered with the negative electrode terminal.

Meanwhile, even though the embodiment of FIG. 9 has been explained based on that the plurality of battery modules are connected in parallel, the plurality of battery modules may also be arranged in series.

The battery module according to the present disclosure may further include a module case 400. In particular, as shown in FIG. 2, the module case 400 may include a first case 401 and a second case 402.

Here, the first case 401 may be configured to have an empty space formed therein so that a part of the cell assembly 100 is accommodated therein. In addition, the second case 402 may be configured to have an empty space formed therein so that a different part of the cell assembly 100 is accommodated therein. Further, the first case 401 and the second case 402 may have separate spaces for respectively accommodating the can-type secondary batteries. For example, as indicated by R1 in FIG. 2, the first case 401 may be configured such that the space therein is divided by partition walls into spaces for accommodating each secondary battery. In addition, as indicated by R2 in FIG. 2, the second case 402 may also be configured such that the space therein is divided by partition walls into spaces for accommodating each secondary battery.

According to this configuration of the present disclosure, it is possible to fix the entire cell assembly 100, each secondary battery and the bus bar at once by the module case 400. In addition, the module case 400 may be made of an insulating material such as a polymer, and in this case, the cell assembly 100 and the bus bar may be easily insulated.

Further, when the can-type secondary battery is a cylindrical secondary battery, the space in the first case 401 and the second case 402 for accommodating the secondary battery, as indicated by R1 and R2, may have a cylindrical shape corresponding to the shape of the can-type secondary battery.

Meanwhile, the spaces R1, R2 in the first case 401 and the second case 402 for accommodating the secondary battery may be configured to penetrate the module case 400 in the longitudinal direction of the secondary battery (in the x-axis direction on the drawing). For example, the hollows R1, R2 for accommodating the secondary battery is formed to penetrate the module case 400 in the right and left direction, so that the electrode of the secondary battery located inside the module case 400 is exposed out of the module case 400. Thus, in this case, the bus bar located at the outside may be in direct contact with the electrode of the secondary battery exposed to the outside.

The first case 401 and the second case 402 may be configured to be coupled to one side and the other side of the cell assembly 100, respectively. For example, in FIG. 2, the first case 401 may be disposed at the right side of the cell assembly 100 to accommodate a right portion of the cell assembly 100. In addition, the second case 402 may be located at the left side of the cell assembly 100 to accommodate a left portion of the cell assembly 100.

In particular, the first case 401 and the second case 402 may be configured to cover one side and the other side of the cell assembly 100, respectively, and also cover the entire side surface of the can-type secondary battery. For example, if the can-type secondary battery is a cylindrical secondary battery, the first case 401 and the second case 402 may be configured to entirely cover the side surface (the curved surface) of the cylindrical battery so that the side surface of the secondary battery is not exposed out of the battery module. According to this configuration of the present disclosure, the module case 400 prevents the side surface of the secondary battery from being exposed, thereby improving the insulation of the secondary battery and protecting the secondary battery from external physical or chemical elements.

In addition, the first case 401 and the second case 402 may be coupled and fixed to each other. That is, a left end of the first case 401 and a right end of the second case 402 may be coupled to each other. By this coupling configuration, it is possible to cover the upper, lower, front and rear surfaces of the cell assembly 100 as a whole. In other words, as the first case 401 and the second case 402 are coupled as above, it is possible to cover the entire side surface of the secondary battery (the curved surface of the cylinder) in FIG. 3. Here, as shown in the figures, the first case 401 and the second case 402 may have a coupling protrusion and a coupling groove formed to correspond to each other and may be coupled and fixed to each other by fitting the coupling protrusion into the coupling groove.

In the configuration where the battery module includes the module case 400 as described above, the bus bar may be attached to the outer side of the module case 400.

For example, seeing FIG. 2, in order to construct the battery module, first, the first case 401 and the second case 402 may be coupled to a right side and a left side, based on the cell assembly 100. After that, the positive electrode bus bar 201 and the negative electrode bus bar 202 may be coupled to the outer side of the first case 401 and the second case 402, respectively.

In this configuration of the present disclosure, the bus bar and the cell assembly 100 may be coupled in a stable way. In particular, since the bus bar may be fixed to the outer side of the module case 400, the contact state between the bus bar and the secondary battery and the contact state between the bus bar and the heat dissipation member 10 may be stably maintained.

In addition, in this case, the insulation between the positive electrode bus bar 201 and the negative electrode bus bar 202 may be secured. In particular, since the positive electrode bus bar 201 may contact only the positive electrode terminal of the can-type secondary battery without contacting the battery can, it is possible to prevent the positive electrode bus bar 201 from being connected to the negative electrode of the secondary battery and thus causing a short circuit. Further, in this case, the module case 400 may be made of an electrical insulation material such as plastic in order to prevent the bus bar from being electrically connected to another bus bar or another portion of the secondary battery unintentionally.

In addition, the bus bar may be bent to surround the upper, side and lower portions of the module case 400.

For example, in FIG. 2, the positive electrode bus bar 201 may be provided at the outer side of the first case 401, namely at the right side thereof, so that the upper end and the lower end thereof are bent toward the inside of the first case 401, namely in the left direction. In addition, due to this bending configuration, the positive electrode bus bar 201 may surround at least a part of each of the upper, side and lower portions of the first case 401 from the outside. At this time, a central portion of the bus bar, which stands in a flat form, may serve as the connection part 210, a portion bent in the left direction at the upper end of the bus bar may serve as the terminal part 230, and a portion bent in the left direction at the left end of the bus bar may serve as the heat transfer part 220.

In addition, in FIG. 2, the negative electrode bus bar 202 may be provided at the outer side of the second case 402, namely at the left side thereof, so that the upper end and the lower end are bent toward the inside of the second case 402, namely in the right direction. In addition, due to this bending configuration, the negative electrode bus bar 202 may surround at least a portion of each of the upper, side, and lower portions of the second case 402 from the outside. In addition, in the negative electrode bus bar 202, a central flat portion may serve as the connection part 210, a bent portion at the upper end may serve as the terminal part 230, and a bent portion at the lower end may serve as the heat transfer part 220.

Also preferably, the module case 400 may have a coupling groove formed so that at least a part of the bus bar may be inserted therein.

Figure 10:
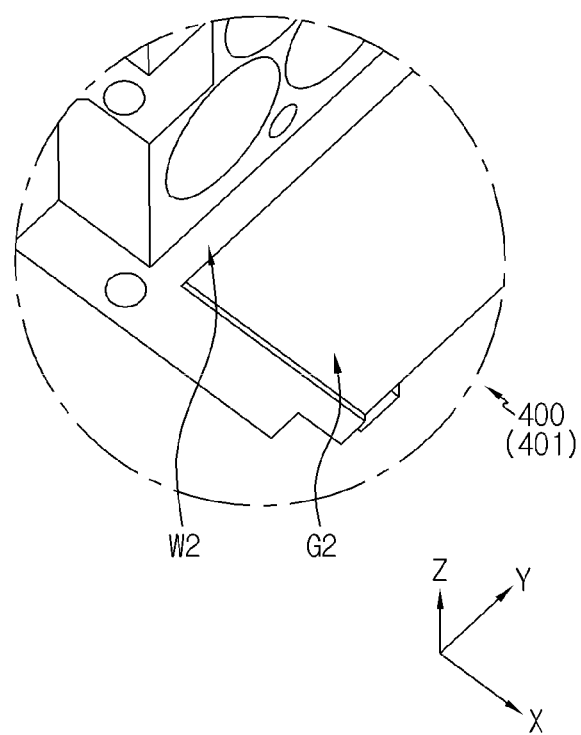
FIG. 10 is an enlarged view showing a portion A2 of FIG. 2.
Figure 11:
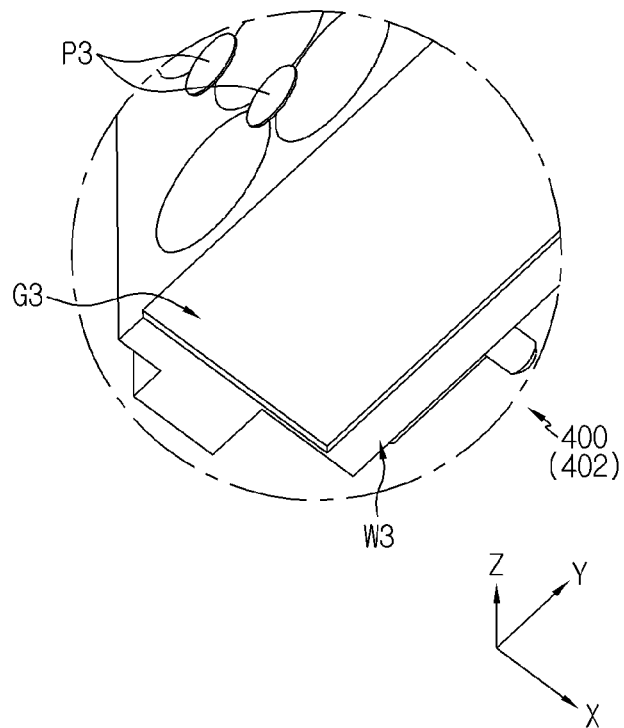
FIG. 11 is an enlarged view showing a portion A3 of FIG. 2.

FIG. 10 is an enlarged view showing a portion A2 of FIG. 2, and FIG. 11 is an enlarged view showing a portion A3 of FIG. 2.

First, referring to FIG. 10, a coupling groove having a concave shape in an upper direction may be formed at the lower surface of the first case 401 as indicated by G2. In addition, when the first case 401 and the positive electrode bus bar 201 are coupled, the heat transfer part 220 of the positive electrode bus bar 201 may be inserted into and placed in the coupling groove G2.

In this configuration, the first case 401 may have a blocking portion formed at an outer side of the end portion of the heat transfer part 220 of the positive electrode bus bar 201. That is, in FIG. 10, the coupling groove G2 may be formed at the lower surface of the first case 401, and the blocking portion protruding downward as indicated by W2 may be provided at the inner side thereof (at the left side on the drawing). In this case, the outer side of the end portion of the heat transfer part 220 inserted into the coupling groove G2 may be blocked by the blocking portion W2 to more securely prevent the heat transfer part 220 of the positive electrode bus bar 201 from moving toward the heat transfer part 220 of the negative electrode bus bar 202 or the heat transfer part 220 of the negative electrode bus bar 202 from moving toward the heat transfer part 220 of the positive electrode bus bar 201. Thus, in this case, the insulation of the positive electrode bus bar 201 and the negative electrode bus bar 202 may be more stably secured.

In addition, referring to FIG. 11, the second case 402 may have a coupling groove having a concave shape in the upper direction as indicated by G3, formed in the lower surface thereof. When the second case 402 and the negative electrode bus bar 202 are coupled, the heat transfer part 220 of the negative electrode bus bar 202 may be inserted into and placed in the coupling groove G3.

In this configuration, the second case 402 may have a blocking portion formed at an outer side of the end portion of the heat transfer part 220 of the negative electrode bus bar 202. That is, in FIG. 11, the coupling groove G3 may be formed at the lower surface of the second case 402, and the blocking portion may be provided at the inner side thereof (in the right side on the drawing) as indicated by W3. In this case, the outer side of the end portion of the heat transfer part 220 inserted into the coupling groove G3 may blocked by the blocking portion W3, thereby more stably securing that the insulation between the negative electrode bus bar 202 and the positive electrode bus bar 201.

Meanwhile, even though it has been described in the embodiment of FIGS. 10 and 11 that the heat transfer part 220 of the bus bar is inserted into the module case 400, it is possible that the connection part 210 and/or the terminal part 230 of the bus bar is inserted into the module case 400.

For example, as indicated by G4 in FIG. 8, a coupling groove may be formed at a rear portion of the upper surface of the first case 401 in positions, numbers and shapes corresponding to the terminal parts of the positive electrode bus bar 201. In addition, the terminal part M2 of the positive electrode bus bar 201 may be inserted into the coupling groove G4.

In addition, as indicated by G5 in FIG. 8, a coupling groove may be formed at a front portion of the upper surface of the second case 402 in positions, numbers and shapes corresponding to the terminal parts of the negative electrode bus bar 202. In addition, the terminal part N1 of the negative electrode bus bar 202 may be inserted into the coupling groove G5.

In addition, coupling grooves may also be formed at a front portion of the upper surface of the first case 401 and at a rear portion of the upper surface of the second case 402, respectively, so that the terminal part M1 of the positive electrode bus bar 201 and the terminal part N2 of the negative electrode bus bar 202 are inserted therein.

According to this configuration of the present disclosure, the coupling between the bus bar, particularly the terminal part 230 of the bus bar, and the module case 400 may be enhanced. In addition, as the terminal part 230 is inserted into the coupling groove, it is possible to reduce the external exposure of the terminal part 230, thereby decreasing unintentional contact of other components to the terminal part 230. Thus, the electrical insulation of the terminal part 230 of the bus bar may be improved. Further, in this case, it is also possible that a terminal part 230 which is not used for electrical connection of the battery module to an external device is inserted into the coupling groove.

In particular, the coupling grooves G4, G5 of the module case 400 may be configured such that a blocking portion is formed at an outer side of the end portion of the terminal part 230.

For example, in FIG. 8, as indicated by W4 and W5, blocking portions may be formed at an outer side of the coupling groove of the module case 400 to prevent the terminal part 230 inserted in the coupling groove from moving outward or prevent another conductor from approaching the terminal part 230 inserted into the coupling groove. Thus, in this case, the contact between the terminal parts 230 of the module bus bar may be blocked more reliably.

In addition, the module case 400 and the bus bar may have a configuration for being coupled to each other.

For example, the second case 402 may have a protruding portion formed to be convex outwardly at an outer surface (at a left surface on the drawing), as indicated by P3 in FIGS.

2 and 11. In addition, the negative electrode bus bar 202 may have a coupling hole formed in positions and shapes corresponding to the protruding portion P3 of the second case 402, as indicated by H3 in FIG. 2. In this case, when the second case 402 and the negative electrode bus bar 202 are coupled, the protruding portion P3 may be inserted into the coupling hole H3.

In addition, the first case 401 and the positive electrode bus bar 201 may also be coupled to each other by having a protruding portion and a coupling hole, similar to the protruding portion of the second case 402 and the coupling hole of the negative electrode bus bar 202.

According to this configuration of the present disclosure, the module case 400 and the bus bar may be coupled more securely and assembled more easily. In addition, in this case, the process of welding the bus bar to the electrode terminal of the secondary battery may be performed more smoothly.

Figure 12:
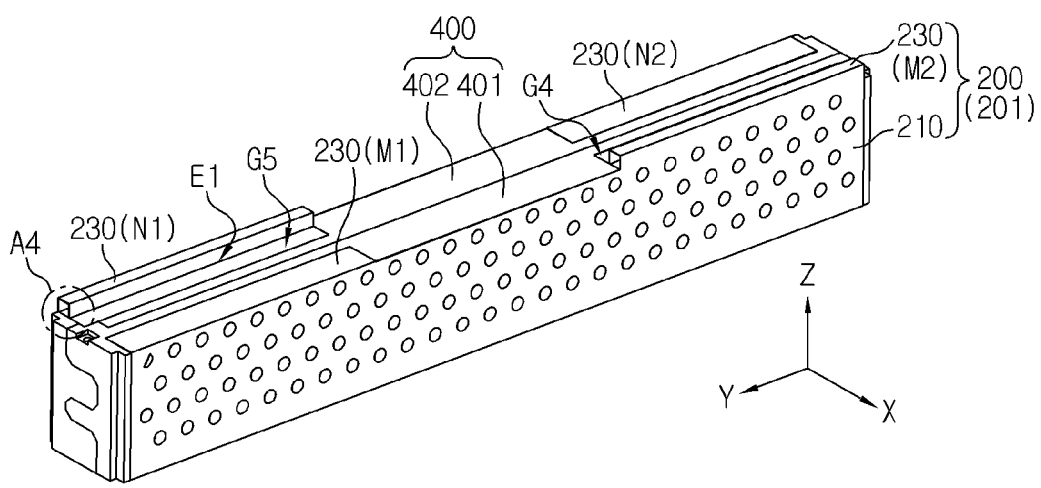
FIG. 12 is a perspective view schematically showing a battery module according to another embodiment of the present disclosure.
Figure 13:
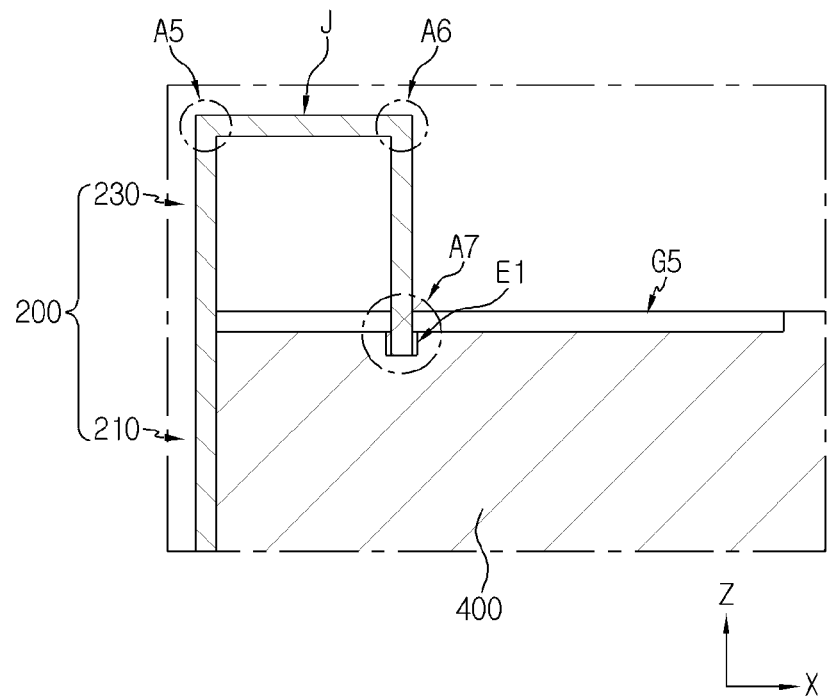
FIG. 13 is a front sectional view showing a portion A4 of FIG. 12.
Figure 14:
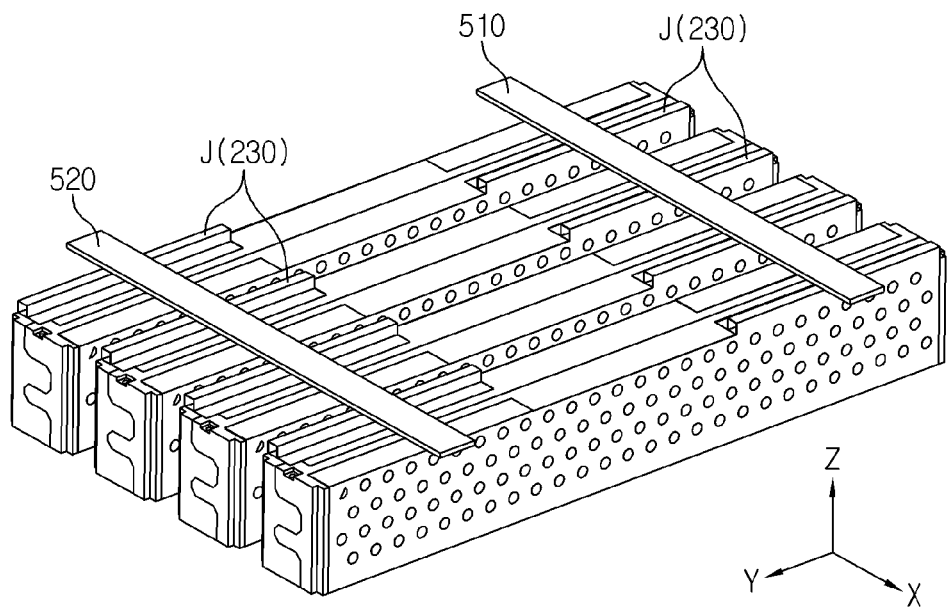
FIG. 14 is a diagram schematically showing that a plurality of battery modules according to another embodiment of the present disclosure are connected.

FIG. 12 is a perspective view schematically showing a battery module according to another embodiment of the present disclosure, FIG. 13 is a front sectional enlarged view showing a portion A4 of FIG. 12, and FIG. 14 is a diagram schematically showing that a plurality of battery modules according to another embodiment of the present disclosure are connected. In this embodiment, features different from the former embodiment will be mainly described, and features that can be applied in a similar or identical way as in the former embodiment will not be explained in detail.

Referring to FIGS. 12 to 14, the terminal part 230 may be configured to protrude toward the upper portion of the module case 400 and then be at least partially bent to extend in the horizontal direction. In particular, referring to FIG. 13, the terminal part 230 may be configured to extend upward from the connection part 210 attached to the outer side of the module case 400 and then be bent at a substantially right angle at a portion indicated by A5 to extend in the horizontal direction. In this case, the terminal part 230 may have is a portion formed flatly in the horizontal direction parallel to the ground in a state of being protruded upward and spaced by a predetermined distance from the upper surface of the module case 400, as indicated by J in FIG. 13.

According to this configuration of the present disclosure, the connection member and the terminal part 230 may more easily and stably connected by means of the portion formed flatly in the horizontal direction parallel to the ground in a state of being protruded toward the upper portion of the terminal part 230, namely the protruding horizontal portion J. In other words, referring to FIG. 12, when the connection member 510 for the positive electrode and the connection member 520 for the negative electrode are configured to contact and connect the terminal part 230, the protruding horizontal portion J of the terminal part 230 may be in surface contact with the connection members 510, 520, respectively. Thus, the electrical contact between the terminal part 230 and the connection members 510, 520 may be more stable and the contact resistance may be further reduced. Moreover, in this case, when the terminal part 230 and the connection members 510, 520 are coupled by welding or the like, the coupling process may be performed more smoothly.

In addition, in the configuration where the protruding horizontal portion J is provided at the terminal part 230, both the connection part 210 and the terminal part 230 may be made of a single integrated metal sheet. That is, the terminal part 230 including the protruding horizontal portion J may be formed as a single metal plate integrated with the connection part 210. In this case, the upper end of the connection part 210 may be bent to form the terminal part 230, particularly the terminal part 230 including the protruding horizontal portion J. According to this configuration of the present disclosure, the bus bar 200 having the terminal part 230 may be manufactured more easily.

Further, the protruding horizontal portion J may be provided at the terminal part that functions as a module terminal of the battery module. For example, in FIG. 12, two terminal parts N1, N2 may be provided as the terminal part 230 of the negative electrode bus bar 202, and the protruding horizontal portion J may be formed only at the terminal part N1 located at the front side. In addition, in FIG. 12, two terminal parts M1, M2 may be provided as the terminal part 230 of the positive electrode bus bar 201, and the protruding horizontal portion J may be formed only at the terminal part M2 located at the rear side.

More preferably, the terminal part 230 may be configured to form the protruding horizontal portion J and then extend downward again. More specifically, referring to FIG. 13, the terminal part 230 may be configured to protrude upwardly from the upper portion of the module case 400, be bent in the horizontal direction at the portion A5 to form the protruding horizontal portion J, and then be bent downward at a substantially right angle at a portion A6. In this case, it may be regarded that at least two bent portions A5, A6 are formed at the terminal part 230.

Meanwhile, in the above configuration, a lower end of the downwardly bent portion of the terminal part 230 may be regarded as an end portion of the terminal part 230 and an upper end portion of the bus bar 200. Here, the end portion of the terminal part 230 may be configured to contact the surface of the module case 400. That is, as indicated by A7 in FIG. 13, the end portion of the terminal part 230 may be configured to be placed on the upper surface of the module case 400.

According to this configuration of the present disclosure, the end portion of the terminal part 230 may be supported in the upper direction by the module case 400. Thus, when or after the connection members 510, 520 come into contact with the protruding horizontal portion J of the terminal part 230, the end portion of the terminal part 230 does not move downward so that the protruding horizontal portion J may be stably kept in the horizontal state. Thus, in this case, the terminal part 230 and the connection members 510, 520 may be connected more smoothly, and the connection state of the terminal part 230 and the connection members 510, 520 may be more stably maintained against vibration, external impact or the like.

Further, in this configuration, the module case 400 may have a placing groove formed so that the end portion of the terminal part 230 is inserted and placed therein. More specifically, referring to FIGS. 12 and 13, a placing groove formed to be concave in the lower direction may be formed at the upper surface of the module case 400, particularly at the upper coupling grooves G4, G5 of the module case 400, as indicated by E1. In addition, the end portion of the terminal part 230 may be inserted downward into the placing groove E1 of the module case 400. In particular, the placing groove E1 of the module case 400 may have a slit shape extending in the front and rear direction of the battery module.

According to this configuration of the present disclosure, since the end portion of the terminal part 230 is inserted into the placing groove E1 of the module case 400, the shape of the terminal part 230 may be stably maintained. In particular, the end portion of the terminal part 230 may not be easily moved in the right and left direction (in the X-axis direction on the drawing). Thus, the protruding horizontal portion J of the terminal part 230 may be easily maintained to be parallel to the upper surface of the module case 400, parallel to the ground, or parallel to the longitudinal direction of the connection members 510, 520. Thus, the contact and connection state of the terminal part 230 and the connection member may be more reliably maintained.

In addition, the battery module according to the present disclosure may further include an insulating panel at the outer side of the bus bar. The insulating panel may be made of an electric insulation material such as polymer, silicone or rubber. Further, the insulating panel may be provided at the outer side of the connection part 210 of the bus bar in a state of standing in the upper and lower direction.

According to this configuration of the present disclosure, since the insulating panel prevents or reduces the exposure of the connection part 210, the electrical insulation to the bus bar may be stably secured.

In addition, in the embodiment where the module case 400 is provided at the battery module, the insulating panel may be coupled to the outer side of the module case 400. For example, a groove may be formed near an outer edge of the module case 400 so that the edge of the insulating panel may be inserted into the groove. Alternatively, a protrusion may be formed at the outer edge of the module case 400 so that the protrusion may be inserted into the edge of the insulating panel.

A battery pack according to the present disclosure may include at least one battery module of the present disclosure. For example, as shown in FIG. 9, the battery pack according to the present disclosure may include a plurality of battery modules, and in this case, may further include a connection member for connecting the battery modules. In addition, the battery pack according to the present disclosure may further include a pack case for accommodating the battery module and various devices for controlling charge/discharge of the battery module such as a battery management system (BMS), a current sensor and a fuse, in addition to the battery module.

The battery module according to the present disclosure may be applied to vehicles such as electric vehicles and hybrid electric vehicles. That is, a vehicle according to the present disclosure may include the battery module of the present disclosure. In particular, in the case of an electric vehicle, the battery module may be disposed at a lower portion of the vehicle. At this time, it is needed that the battery module does not have a great height. Moreover, the cooling performance is also very important for the battery module of a vehicle. Thus, if the battery module according to the present disclosure is applied to the vehicle, the battery module may ensure low height and stable cooling performance.

Meanwhile, even though the terms indicating up, down, left, right, front and rear directions are used in the specification, it is obvious to those skilled in the art that these terms merely represent relative locations for convenience in explanation and may vary based on a location of an observer or a shape in which an object is placed.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

10: heat dissipation member
100: cell assembly
110: secondary battery
200: bus bar
201: positive electrode bus bar 202: negative electrode bus bar
210: connection part 220: heat transfer part 230: terminal part
300: thermal pad
400: module case
401: first case 402: second case
510: connection member for a positive electrode
520: connection member for a negative electrode

What is claimed is:

1. A battery module, comprising:
a heat dissipation member disposed at a lower portion of the battery module;
a cell assembly having a plurality of can-type secondary batteries stacked in a horizontal direction; and
a first bus bar comprising:
a connection part extending in a vertical direction and configured to contact the electrodes of two or more of the plurality of can-type secondary batteries of the cell assembly to electrically connect the two or more can-type secondary batteries, the connection part having an upper edge and a lower edge; and
a heat transfer part extending in the horizontal direction from the lower edge of the connection part to contact the heat dissipation member and configured to transfer heat of the plurality of can-type secondary batteries to the heat dissipation member;
a module case including a first case having an empty space formed therein to accommodate an upper portion of the cell assembly and a second case having an empty space formed therein to accommodate a bottom portion of the cell assembly; and
a coupling groove formed in an outer surface of the module case,
wherein the heat transfer part is inserted in the coupling groove so that the heat transfer part is between the module case and heat dissipation member, and
wherein the bus bar is least partially made of an electrically conductive material.

2. The battery module according to claim 1,
wherein the heat transfer part is interposed between a lower portion of the cell assembly and an upper portion of the heat dissipation member.

3. The battery module according to claim 1, wherein the connection part of the first bus bar contacts a positive electrode of each can-type secondary battery provided in the cell assembly, and
further comprising a second electrode bus bar having a connection part contacting a negative electrode of each can-type secondary battery provided in the cell assembly.

4. The battery module according to claim 3,
wherein the first electrode bus bar and the second electrode bus bar are located at opposite sides of the cell assembly, and
wherein the heat transfer part of the first electrode bus bar and a heat transfer part of the second electrode bus bar are bent in opposite directions.

5. The battery module according to claim 3, wherein the second electrode bus bar contacts the heat dissipation member, and
wherein the battery module further includes a thermal pad interposed between the heat dissipation member and at least one of the first electrode bus bar and the second electrode bus bar, the thermal pad being configured to transfer heat of the bus bar to the heat dissipation member, the thermal pad being made of an electrically insulating material.

6. The battery module according to claim 1, further comprising at least one terminal part extending from the upper edge of the connection part, the at least one terminal part having a terminal for electrical connection to an external component.

7. The battery module according to claim 6, wherein the at least one terminal part extends from the upper edge of the connection part and is bent in the horizontal direction.

8. The battery module according to claim 6, wherein the at least one terminal part includes two terminal parts, the two terminal parts being spaced from each other by a predetermined distance.

9. A battery pack, comprising at least one battery module defined in claim 1.

10. A vehicle, comprising at least one battery module defined in claim 1.

11. The battery module according to claim 1, further comprising a first terminal part extending in the vertical direction from an upper edge of the connection part; and a second terminal part extending in the horizontal direction from the upper edge of the connection part.

12. The battery module according to claim 1, wherein the first case of the module case directly contacts the second case of the module case.

13. The battery module according to claim 3, wherein the connection part of the first bus bar forms a first exterior side surface and the connection part of the second bus bar forms a second exterior side surface.

* * * * *